United States Patent [19]

Binks

[11] Patent Number: 5,129,978
[45] Date of Patent: Jul. 14, 1992

[54] METHOD OF CONTAMINATION FREE IRONING OF WET STATE SUBSTANCES ON SELECTED AREAS

[75] Inventor: Chester Binks, LaGrange, Ill.

[73] Assignee: Solar-Kist Corporation, LaGrange, Ill.

[21] Appl. No.: 551,071

[22] Filed: Jul. 11, 1990

[51] Int. Cl.⁵ .............................................. B32B 31/00
[52] U.S. Cl. ..................................... 156/289; 156/299; 156/305; 156/314; 156/323
[58] Field of Search ............... 156/289, 299, 323, 240, 156/247, 344, 295, 277, 278, 291, 284, 305, 309.6, 314; 428/139, 140

[56] References Cited

U.S. PATENT DOCUMENTS

| | | | |
|---|---|---|---|
| 2,096,750 | 5/1935 | Lawrence | 41/34 |
| 2,688,579 | 9/1954 | Meyer | 154/95 |
| 2,710,046 | 6/1955 | Markus et al. | 154/125 |
| 3,783,073 | 1/1974 | Warnberg | 156/230 |
| 3,932,250 | 1/1976 | Sato et al. | 156/213 |
| 4,131,502 | 12/1978 | Mitra | 156/179 |
| 4,257,834 | 3/1981 | Iida et al. | 156/73.6 |
| 4,564,406 | 1/1986 | Binks | 156/63 |
| 4,597,812 | 7/1986 | Hamilton | 156/63 |
| 4,735,854 | 4/1988 | Lauchenauer | 428/347 |
| 4,737,225 | 4/1988 | Waugh et al. | 156/242 |
| 4,921,562 | 5/1990 | Fujii | 156/224 |

*Primary Examiner*—David A. Simmons
*Assistant Examiner*—J. Sells
*Attorney, Agent, or Firm*—Hill, Van Santen, Steadman & Simpson

[57] ABSTRACT

A method of drying a substance applied in a wet condition on a selected area comprising engaging a nonstick pressing sheet on said area, and by means of a heated pressing and drying surface applying drying heat and pressure to said area through said sheet and thereby drying said substance. The substance may be a nonbonding material, a bonding material or a combination of the bonding material and a nonbonding material.

6 Claims, 1 Drawing Sheet

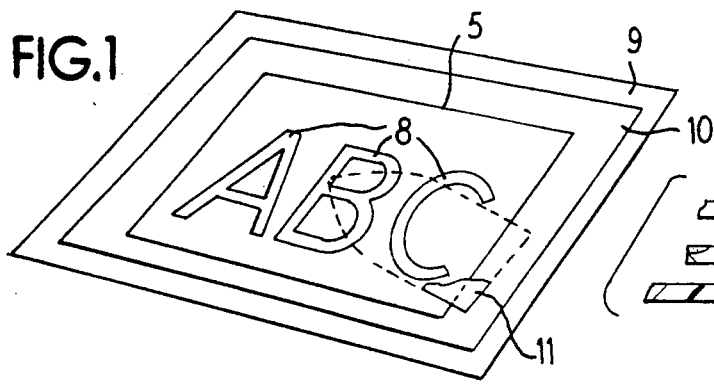
FIG.1
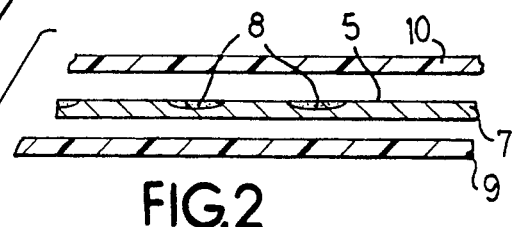
FIG.2
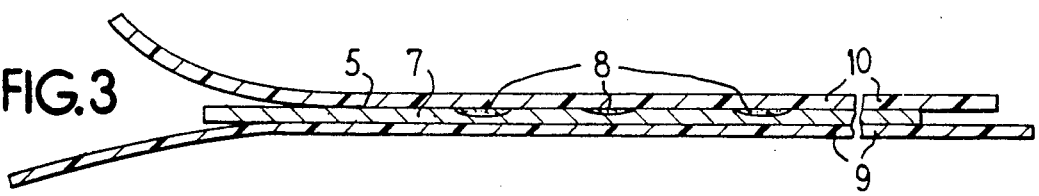
FIG.3
FIG.4
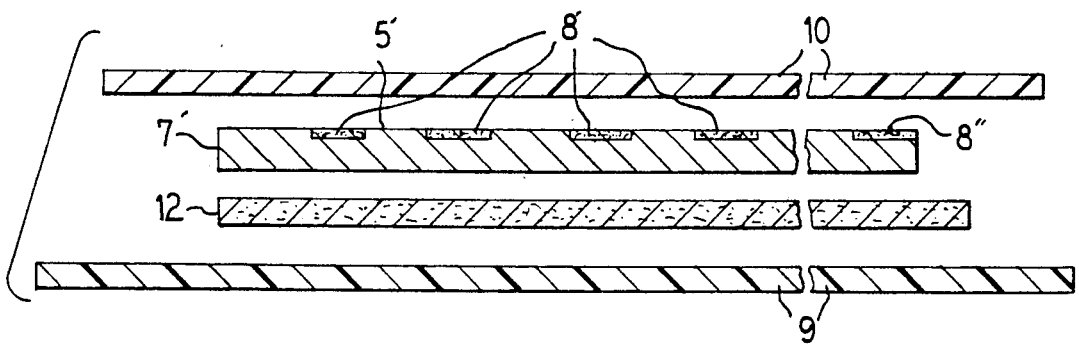
FIG.5
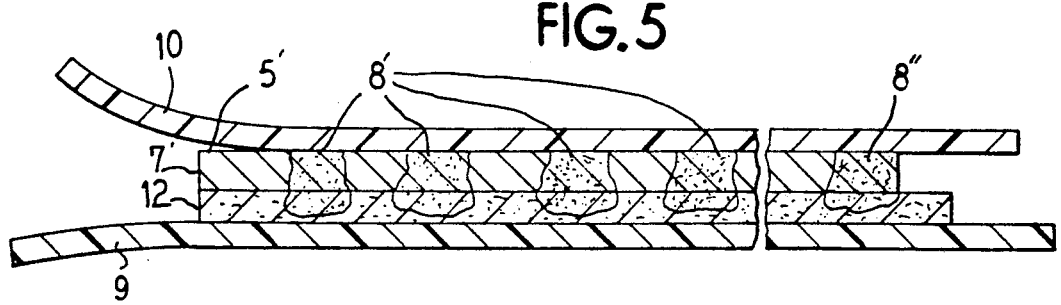

METHOD OF CONTAMINATION FREE IRONING OF WET STATE SUBSTANCES ON SELECTED AREAS

BACKGROUND OF THE INVENTION

The present invention relates to a new and improved manner of drying wet materials in absorbent areas, such as may exist on fabrics or like areas for the purpose of accelerating drying, and heat setting of such materials, and is more particularly concerned with avoiding contamination of an ironing means surface, such as the sole plate of a hand operated flat iron, or a pressing machine, or a mangle-type ironer without resulting damage to the liquid applied areas. In fact, substantial improvements to such surfaces are possible.

Fabrics and like porous areas may have applied thereto numerous and varied liquid substances, such as paints, dyes, inks, various treating fluids, starches, and even water which may contain a considerable mineral content, and all of which to at least some degree may tend to contaminate a drying and pressure applying surface means such as the sole plate of a flat iron, or the two rollers of a mangle-type iron, or the two platens of a pressing machine. In fact, certain wet materials cannot be dried by means of such a drying and pressure applying surface applied directly thereto because of extreme contamination of such surface of and smearing of the face area of the material to which such surface is applied.

Wet paints, dyes and inks are with some frequency placed on selected areas of garment fabrics, especially for ornamental purposes, such as to print or paint slogans, decorative designs and the like, for example on t-shirts, skirts, sweatshirts, and the like. Heretofore, drying procedures have involved expedients such as air streams from hair dryers, hanging the articles up to dry, drying in an oven or in a conventional clothes dryer. Those expedients may take anywhere from hours to several days before the treated area is completely dry and can be safely handled.

There are situations were artists prefer to apply wet paints to canvas or Chino Vino fabric to produce better quality paintings, with greater detail. Such paintings, on separate sections of fabric, are then bonded to garments, or even framed for wall-hanging. Drying is a problem.

Silk screening is a popular way in which various and sundry designs and ornamentations are applied to fabric or other porous articles. The drying of silk screened articles has entailed considerable time, especially where it is not practical to use a highly volatile solvent. Where such solvent is used, the pigment viscosity must be carefully controlled to avoid a lumpy appearance of the imprint where a flat appearance is desired. Regardless of whether the fast volatilization or slow drying process is used, there is often less than desirable fiber penetration and coating of the imprinted material for washfast purposes.

If an attempt is made to effect quick drying of a wet substance such as printed or decorative means on an area, or even where an area is impregnated with a solids containing fluid substance, by direct application of a pressing and drying surface means, such as a flat iron, it can be expected that the drying surface means may become intolerably befouled or contaminated by adherence thereto of contaminants from the substance on the area to be dried.

As a matter of fact, where an area is wet or wetted with water, other than distilled water, there is often such a volume of mineral matter in the water as to cause contamination of an iron used to iron and dry the wet area.

SUMMARY OF THE PRESENT INVENTION

An important object of the present invention is to provide a new and improved method of pressing and drying wet substances absorbed in selected areas without contamination of a pressing and drying surface means.

Another object of the invention is to provide a new and improved method of applying drying heat and pressure to porous areas having wet substance absorbed thereon, while protecting such areas and any decorative patterns formed by the wet substance against damage, and protecting the heating and pressing means against contamination.

A further object of the invention is to effect improved drying and fiber impregnation of wet paint, dye or ink on absorbent areas to which applied, thereby improving wear and washability.

Yet another object of the invention is to effect bonding of a porous article to a substrate by means of a wet substance, having bonding facility, applied onto an exposed area of the article and against which area heat and pressure are applied through a protective sheet, such a sheet having non-stick, high releasing qualities.

Still another object of the invention is to improve the appearance of painted, dyed or ink decorated absorbent areas, while avoiding any damage or negative changes that may be caused by normal drying methods.

Pursuant to the present invention, there is provided a method of drying a wet substance applied in a liquid state on a selected area by means of a heated pressing and drying surface, comprising engaging the area with a nonstick pressing sheet such as TFE or similar release material overlying the wet substance, and by means of the surface applying drying heat and pressure to the area through the release sheet and thereby drying the substance while, by means of the sheet intervening between the surface and the area, avoiding contamination of the surface by any contaminants which might otherwise by picked up from the area and adhere to the surface.

BRIEF DESCRIPTION OF THE DRAWINGS

Other objects, features and advantages of the present invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a schematic perspective view demonstrating how the method of the present invention may be practiced;

FIG. 2 is a fragmentary exploded assembly view of the article shown in FIG. 1;

FIG. 3 is a sectional detail view taken in a similar plane as FIG. 2 and showing the same after drying of the wet substance has been effected;

FIG. 4 is an exploded assembly view, taken in a similar plane as FIG. 2 but showing a modification;

FIG. 5 is a sectional detail view similar to FIG. 4 but showing how not only improved penetration and fiber coating is attained but also laminating is attainable by the present invention.

DETAILED DESCRIPTION

Referring to FIGS. 1, 2 and 3, an upwardly facing absorbent area 5 on a member 7 has applied thereto a wet substance 8 which may be dye, non-dimensional paint, ink, or other substance applied in a liquid state absorbed within the area 5, and shown, by way of example, in the form of an imprinted or otherwise applied design although it may cover and be absorbed in the entire area. The member 7 is mounted removably on a base 9. Protectively applied in covering relation on the area 5 and the wet substance 8 is a protective, nonstick, release pressing sheet 10. This sheet should be highly releasable, temperature resistant, thermally conductive, reusable, long lasting, and inert such as TFE. Drying and setting of the substance 8 is effected by applying heat and pressure thereto through the release sheet 10 as by means of a heated pressing and drying surface such as a pressing machine, mangle type ironer, or the sole plate of an electrically or otherwise heated hand operated flat iron 11 functioning in ironing fashion over the pressing sheet.

By way of example, the member 7 may be an applique piece fashioned from any suitable fabric. The wet substance 8 may be applied to the area 5 of the member 7 in any preferred manner, such as by brushing, printing, surface transfer, wiping on, roller application, by a hand painting air gun application, immersion of the member 7, partial or all-over wetting liquid, and the like.

Silk screening is considered printing because it is adapted for repetitive application of the same design, text or slogan to a member by means of wet coloring material. Stencil painting is similarly categorized as printing. Free-hand or ruler assisted or air brush drawing or painting, or partial or total coating or saturation of the wet substances on the member may be practiced. Sometimes a whole piece may be dyed in a single color or multiple colors, or in any event, by whatever technique the wet substance is applied, or whatever its purpose, it will require drying and setting and which can be effected simply, efficiently and advantageously by the method of the present invention.

In one best mode of the present invention where the member 7 may be relatively thin fabric so that the wet substance 8 may bleed through the fabric, and especially where the substance 8 may have some sticky or adhesive characteristic, and it is desired to avoid sticking not only to the release sheet 10 but also to the base 9, the base 9 may be a TFE polytetrafluoroethylene underlay sheet or nonstick coated means. Of course, if the substance 8 is totally nonadhesive, the base 9 may be a piece of paper or cardboard or any other supporting surface which may not be objectionably discolored if the substance 8 bleeds through the member 7. The TFE pressing sheet 10 is ideally used in the practice of the present invention because it has the desirable quality of nonadherence of any material that may be employed for the substance 8 on the member 7. Further, the sheet 10 may comprise a TFE (polytetrafluoroethylene) film of thin, light weight, such as from approximately 0.001" to 0.005" thickness. This TFE material is free from deterioration when subject to temperatures well above pressing iron temperatures and which may be as high as up to 500° F. when rapid drying action is desired.

After the member 7 with the substance 8 absorbed therein is placed on the base 9 with the area 5 facing away from the base, the nonstick release pressing sheet 10 is applied over the assembly and the sole plate of the heated iron 11, or other pressing and heating means is maneuvered on the sheet 10 over the area 5 and the heat of the iron transmitted through the sheet 10 effects drying, and the pressure of the iron improves fiber penetration and coating and thus thorough adherence of the substance 8 on and into the fabric of the member 7.

When the rapid drying and setting has been completed, the assembly is separated and the member 7 may be used for whatever purpose desired.

Although the member 7 has been shown as a rectangular piece in FIG. 1, it may be of any peripheral shape desired for the particular purpose intended whether to serve as an applique to be sewed on or adhesively attached, or whatever.

Furthermore, where the design provided by the substance 8 is to be applied directly to a garment, such as a sweatshirt or the like, it will be apparent that the present method is ideally suited for drying and setting of the design on the garment.

Where it is desired to apply the member 7 as an applique, attachment of the member 7 may be effected by the same heat as used to dry and set the substance 8, by applying a heat fusible or settable adhesive on the back or lower face area of the member 7.

Certain additional advantages of using the TFE pressing sheet 10 for drying and/or setting of wet substance on a fabric may be mentioned. Sheen is avoided on materials which may be susceptible to undesired sheen when only an iron is used. Materials such as silks, lame, plastic spangle or sequin equipped materials, woolen knits, nylons or any other delicate or synthetic materials which ordinarily may be damaged by a heated iron are to some extent protected from such damage by the TFE pressing sheet. After drying and setting of the substance 8 by the intervention of the TFE pressing sheet 10, the dyed, inked or painted substance 8 has a uniform finished surface without voids or aberrations where careful application of the substance has been effected. Where the substance 8 is paint incorporating glittering particles, such particles sparkle more and more of the glitter particles are forced to the paint surface, and that taken together with the smoothness of the finished dried paint surface provides an enhanced glittering appearance.

For some purposes, it may be desirable to attain adhesion of the piece of fabric carrying the wet substance to a substrate and form a laminate. While, as mentioned, this may, if desired, be effected by simultaneously applying a heat settable or fusion type of adhesive between the fabric piece and the substrate, where the wet substance applied to the upwardly facing area of the fabric piece has bonding qualities, that substance itself may serve as a bonding agent for the laminate. To this end, the fabric piece member 7' (FIGS. 4 and 5) may have applied to its upwardly facing face area 5' wet substance 8' in any preferred pattern and embodying sufficient adhesive bonding quality such that when the member 7' is applied to a substrate 12, which because of its surface porosity is susceptible to adhesive bonding, and the pressing sheet 10 is applied over the assembly and heat and pressure applied as by means of the flat iron 11, the substance 8' will be caused to penetrate through the porous fabric of the member 7' and bleed into the porous surface of the substrate 12 so that upon drying the substance 8' not only provides on the surface of the member 7' the desired dried design or pattern but also will be thoroughly bonded to the substrate by the dried and set material 8'. If desirable, of course, the protective underlay sheet or panel 9 may be applied under the substrate if deemed desirable.

For some purposes, it may not be desired to use in the wet substance 8' a material which has inherent bonding properties suitable for effecting bonding of the member 7' to the substrate 12. In such instance, the pattern or design may be provided by the substance 8' which meets the criteria desired without the bonding capability, and supplemental thereto a liquid substance 8" particularly selected for its bonding performance upon drying and setting may be applied at a desired place on the area 5'. This may be effected along one or more edges of the member 7' either at the same time as the substance 8' is applied or after the substance 8' has been dried and set. Upon penetration of the substance 8" through the fabric of the member 7' and into adhesive bonding with the substrate 12 there will be attained thorough attachment of the member 7' to the substrate 12.

As a matter of fact, if it is desired to effect bonding of the piece 7 of FIG. 1, where that piece is a porous fabric, to a substrate such as the substrate 12, the technique of applying a bonding substance 8" to the area 5, such as along one or more margins, may be effected and heat drying and bonding as described for FIGS. 4 and 5 may be effected.

Regardless of which mode of the present invention is employed, after the drying and pressing procedure has been carried out, the nonstick pressing sheet 10 is readily removed from the finished surface without distrubing the finished surface of the member 7 or 7' as the case may be, as indicated by the peel-away showing in FIGS. 3 and 5. Further, where, as in FIG. 3, the member 7 is underlain by a nonstick (e.g. TFE) base 9, after the drying and setting has been completed, the member 7 can be readily removed from the base 9, as seen in the peel-away showing in FIGS. 3 and 5.

Where there is no bonding proclivity of the substance 8, the base 9 may, of course, be any desired underlay, even a piece of paper, cardboard or shirt board, and which will not be damaged by the pressing heat.

It will be understood that variations and modifications may be effected without departing from the spirit and scope of the novel concepts of the present invention.

What is claimed is:

1. A method of drying a substance on a selected area on a porous member by means of a heated pressing and drying surface, comprising:

providing a wet substance in the form of a nonbinding material and applying the wet substance to said area;

engaging said area with a nonstick release sheet overlying said wet substance;

applying drying heat and pressure by means of said heated surface to said area through said sheet and thereby drying said substance while, by means of said sheet intervening between said surface and said area, avoiding contamination of said surface by any contaminants which might otherwise by picked up from said area and adhered to said surface;

after applying said drying of said wet substance applying to said area a heat bondable material; and heat bonding said member to a substrate by penetration of said heat bondable material through said porous member.

2. A method according to claim 1, which comprises supplying said sheet as a piece of polytetrafluoroethylene sheet.

3. A method according to claim 1, which comprises supplying said wet substance selected from paint, dye or ink, or water.

4. A method according to claim 1, which comprises applying the wet substance as a partial or all-over wetting liquid on said area.

5. A method according to claim 1, which comprises applying said wet substance as a pattern on said area.

6. A method according to claim 5, which comprises providing said area on a fabric member, and supporting said fabric member on a nonstick underlay.

* * * * *